A. A. ADAMS.
Manufacture of Glass-Ware.

No. 162,330.          Patented April 20, 1875.

WITNESSES
R. C. Wrenshall
James I. Kay

INVENTOR
Adolphus A. Adams
Bakewell & Kerr
Attorneys

UNITED STATES PATENT OFFICE.

ADOLPHUS A. ADAMS, OF PITTSBURG, PENNSYLVANIA.

IMPROVEMENT IN THE MANUFACTURE OF GLASSWARE.

Specification forming part of Letters Patent No. 162,330, dated April 20, 1875; application filed March 3, 1875.

*To all whom it may concern:*

Be it known that I, ADOLPHUS A. ADAMS, of Pittsburg, in the county of Allegheny and State of Pennsylvania, have invented a new and useful Improvement in Manufacture of Glassware; and I do hereby declare the following to be a full, clear, and exact description thereof, reference being had to the accompanying drawing forming part of this specification, in which—

Figure 1:
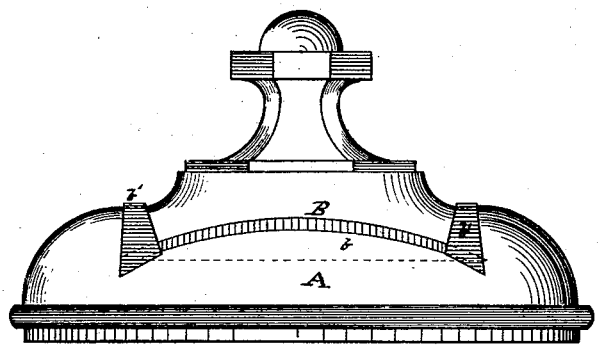
Figure 2:
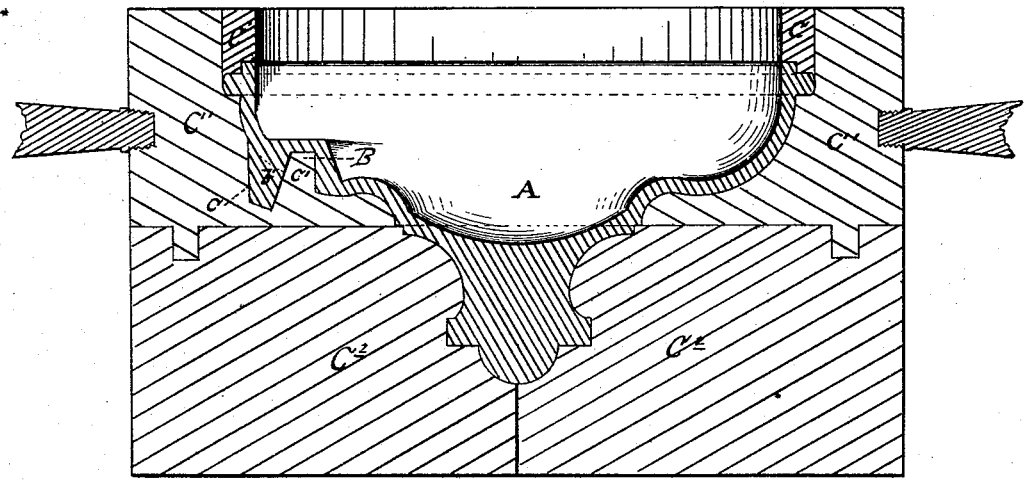

Figure 1 is a view of a glass cover for nappies, bowls, or similar articles, embodying my invention; and Fig. 2 is a section of the same, and also of a mold which may be employed for producing the article.

Like letters refer to like parts wherever they occur.

My invention relates to the manufacture of glass covers for bowls, nappies, and similar articles; and it consists in forming in or upon the cover a rest or support for a knife, spoon, or like article generally employed with nappies, &c. In articles of glassware having covers, as heretofore formed, the cover could not shut closely if the knife or spoon were left in the dish, and if the knife or spoon were removed from the dish it could not be laid upon the table without danger of soiling the surface thereof, both of which inconveniences in articles of glassware it is the object of the present invention to obviate.

In the drawing, A represents the cover of a nappy, having a rest, B, formed thereon or attached thereto, preferably formed at the time of blowing or pressing the cover. This rest B consists of a depression or channel, $b$, guarded at its outer side by lugs or projections $b'$, and when formed as shown in the drawing, it will generally be found that no lugs will be required upon the inner edge of the channel, for the reason that the channel projects sufficiently below the upper surface of the cover to steady the knife or other article. The article may be formed in a sectional mold, such as shown in Fig. 2, in which $C$ $C^1$ $C^2$ represent the several parts, $C$ and $C^1$ being rings, the latter of which is recessed, as at $c$, to form the lugs $b'$, and projects, as at $c'$, to form channel $b$. The lower section $C^2$ may be hinged when the outline of the article requires it; but in other cases but two rings, $C$ and $C^1$, forming a solid mold, can be used. The plungers employed with the mold will, of course, correspond in outline to the inner surface of the cover A. The article may be pressed in the usual manner, and removed from ring $C^1$ by reversing the ring.

Having thus described my improved article of glassware, and the means for producing it, what I claim as my invention, and desire to secure by Letters Patent, is—

A glass cover for nappies, bowls, and similar articles, having a rest, B, formed thereon or attached thereto, substantially as and for the purpose specified.

In testimony whereof I, the said ADOLPHUS A. ADAMS, of Pittsburg, Allegheny county, Pennsylvania, have hereunto set my hand.

ADOLPHUS A. ADAMS.

Witnesses:
 T. B. SNYDER,
 GEO. L. GUY.